United States Patent
Rodrigues et al.

(10) Patent No.: US 11,007,485 B2
(45) Date of Patent: May 18, 2021

(54) FILTERS COMPRISING SIC MEMBRANES INCORPORATING NITROGEN

(71) Applicant: SAINT-GOBAIN CENTRE DE RECHERCHES ET D'ETUDES EUROPEEN, Courbevoie (FR)

(72) Inventors: Fabiano Rodrigues, Roussillon (FR); Jérôme Sant, Les Angles (FR); Gilles Rossiquet, Louzac Saint-Andre (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 391 days.

(21) Appl. No.: 15/536,874

(22) PCT Filed: Dec. 18, 2015

(86) PCT No.: PCT/FR2015/053663
§ 371 (c)(1),
(2) Date: Jun. 16, 2017

(87) PCT Pub. No.: WO2016/097661
PCT Pub. Date: Jun. 23, 2016

(65) Prior Publication Data
US 2017/0348641 A1 Dec. 7, 2017

(30) Foreign Application Priority Data
Dec. 18, 2014 (FR) ...................... 1462768

(51) Int. Cl.
*B01D 63/06* (2006.01)
*B01D 71/02* (2006.01)
(Continued)

(52) U.S. Cl.
CPC ....... *B01D 63/066* (2013.01); *B01D 46/2418* (2013.01); *B01D 67/0041* (2013.01);
(Continued)

(58) Field of Classification Search
CPC .............. C04B 38/0096; C04B 35/565; C04B 2235/3826; C04B 2235/383; C04B 2235/3834; B01D 63/066
See application file for complete search history.

(56) References Cited

U.S. PATENT DOCUMENTS

| | | | |
|---|---|---|---|
| 3,875,477 A | 4/1975 | Fredriksson et al. | |
| 4,230,497 A * | 10/1980 | Schwetz | C04B 35/565 264/29.3 |

(Continued)

FOREIGN PATENT DOCUMENTS

| | | |
|---|---|---|
| CN | 104174298 A | 12/2014 |
| EP | 0 219 383 A1 | 4/1987 |

(Continued)

OTHER PUBLICATIONS

M. Nader & F. Aldinger, Influence of the -SiC phase transformation on microstructural development and mechanical properties of liquid phase sintered silicon carbide, 34 J. Mater. Sci. 1197, 1197-1204 (1999). (Year: 1999).*

(Continued)

*Primary Examiner* — Krishnan S Menon
*Assistant Examiner* — Brad Gordon
(74) *Attorney, Agent, or Firm* — Pillsbury Winthrop Shaw Pittman LLP

(57) ABSTRACT

A filter for the filtration of a fluid, such as a liquid, includes or is composed of a support element made of a porous ceramic material, the element exhibiting a tubular or parallelepipedal shape delimited by an external surface and including, in its internal portion, a set of adjacent channels with axes parallel to one another and separated from one another by walls of the porous inorganic material, in which at least a portion of the channels and/or at least a portion of the external surface are covered with a porous separating membrane layer, wherein the separating membrane layer is (Continued)

made of a material essentially composed of silicon carbide (SiC), and the content by weight of elemental nitrogen of the layer constituting the porous separating membrane layer is between 0.1% and 2%.

10 Claims, 2 Drawing Sheets

(51) Int. Cl.
    *B01D 46/24*     (2006.01)
    *C04B 35/565*     (2006.01)
    *C04B 35/584*     (2006.01)
    *C04B 35/597*     (2006.01)
    *B01D 69/10*     (2006.01)
    *B01D 67/00*     (2006.01)
    *C04B 38/00*     (2006.01)
    *C04B 35/622*     (2006.01)

(52) U.S. Cl.
CPC ..... *B01D 67/0046* (2013.01); *B01D 67/0083* (2013.01); *B01D 69/10* (2013.01); *B01D 71/02* (2013.01); *C04B 35/565* (2013.01); *C04B 35/584* (2013.01); *C04B 35/597* (2013.01); *C04B 35/62222* (2013.01); *C04B 38/0006* (2013.01); *B01D 2046/2433* (2013.01); *B01D 2046/2437* (2013.01); *B01D 2325/02* (2013.01); *C04B 2235/3826* (2013.01); *C04B 2235/3873* (2013.01); *C04B 2235/48* (2013.01); *C04B 2235/656* (2013.01); *C04B 2235/6581* (2013.01); *C04B 2235/6584* (2013.01)

(56) References Cited

U.S. PATENT DOCUMENTS

| | | | | | |
|---|---|---|---|---|---|
| 4,533,584 | A | * | 8/1985 | Takeuchi | B01J 15/00 422/180 |
| 5,114,581 | A | * | 5/1992 | Goldsmith | B01D 39/2075 210/108 |
| 5,143,614 | A | * | 9/1992 | Soria | B01D 63/061 210/321.61 |
| 5,298,470 | A | * | 3/1994 | Chia | C04B 35/575 501/89 |
| 5,641,332 | A | * | 6/1997 | Faber | B01D 46/005 55/523 |
| 7,699,903 | B2 | | 4/2010 | Stobbe et al. | |
| 2010/0059434 | A1 | * | 3/2010 | Bishop | B01D 63/066 210/490 |

FOREIGN PATENT DOCUMENTS

| | | |
|---|---|---|
| EP | 2 484 433 A1 | 8/2012 |
| EP | 2 511 250 A1 | 10/2012 |
| FR | 2 549 736 A1 | 2/1985 |
| WO | WO 03/024892 A1 | 3/2003 |
| WO | WO 2010/028330 A1 | 3/2010 |

OTHER PUBLICATIONS

M.H. Jaskowiak, Effects of High Pressure Nitrogen on the Thermal Stability of SiC Fibers, NASA Technical Memorandum 103245, 1-16 (1991). (Year: 1991).*

International Search Report as issued in International Patent Application No. PCT/FR2015/053663, dated Apr. 18, 2016.

LiqTech website, Retrieved from the Internet, URL: <http://www.liqtech.com/img/user/file/FSM_Sheet_F_4_260214V2.pdf.> Retrieved on Jun. 13, 2017.

* cited by examiner

FILTERS COMPRISING SIC MEMBRANES INCORPORATING NITROGEN

CROSS-REFERENCE TO RELATED APPLICATIONS

This application is the U.S. National Stage of PCT/FR2015/053663, filed Dec. 18, 2015, which in turn claims priority to French patent application number 1462768 filed Dec. 18, 2014. The content of these applications are incorporated herein by reference in their entireties.

The invention relates to the field of filtering structures made of an inorganic material which are intended for the filtration of liquids, in particular the structures coated with a membrane in order to separate particles or molecules from a liquid, more particularly from water.

Filters which use ceramic or nonceramic membranes to carry out the filtration of various fluids, in particular polluted water, have been known for a long time. These filters can operate according to the principle of frontal filtration, this technique involving the passage of the fluid to be treated through a filtering media perpendicularly to its surface. This technique is limited by the accumulation of particles and the formation of a cake at the surface of the filtering media. This technique is thus more particularly suitable for the filtration of liquids not comprising high loads of pollutants (that is to say, the liquid or solid particles in suspension).

According to another technique to which the present invention also relates, use is made of tangential filtration which, in contrast, makes it possible to limit the accumulation of particles by virtue of the longitudinal circulation of the fluid at the surface of the membrane. The particles remain in the circulating stream, while the liquid can pass through the membrane under the effect of the pressure. This technique provides stability of the performance and of the level of filtration.

The strong points of tangential filtration are thus its ease of use, its reliability, by virtue of the use of organic and/or inorganic membranes, the porosity of which is suitable for carrying out said filtration, and its continuous operation. Tangential filtration requires little or no adjuvant and provides two separate fluids which may both be of economic value: the concentrate (also known as retentate) and the filtrate (also known as permeate); it is regarded as a clean process which is environmentally friendly. Tangential filtration techniques are used in particular for microfiltration or ultrafiltration. The tangential configuration generally requires the use of at least two pumps, one a pressurization (or booster) pump and the other a recirculation pump. The recirculation pump often exhibits the disadvantage of a sizable energy consumption. The use of filtering devices guaranteeing high flow rates of the filtrate would make it possible to limit the energy consumption.

The present invention is thus suitable just as much for tangential filters as for frontal filtration filters.

Numerous filter structures operated according to the principles of tangential filtration or of frontal filtration are thus known from the current art. They comprise or are formed from tubular or parallelepipedal supports made of a porous inorganic material formed of walls delimiting longitudinal channels parallel to the axis of said supports.

In the case of tangential filters, the filtrate passes through the walls and is then discharged at the peripheral external surface of the porous support. These filters are more particularly suitable for filtering liquids having high loads of particles.

In the case of the frontal filters, the longitudinal channels are normally blocked at one end, for example alternately, so as to form inlet channels and outlet channels separated by the walls of the channels, the inlet and/or outlet channels being coated with a filtering membrane through which all the liquid passes, the particles being retained by the membrane.

The surface of said channels is generally normally covered with a membrane, preferably made of a porous inorganic material, known as membrane, membrane layer or separating membrane layer in the present description, the nature and the morphology of which are suitable for halting the molecules or the particles, the size of which is close to or greater than the median diameter of the pores of said membrane, when the filtrate spreads through the porosity of the porous support under the pressure of the fluid passing through the filter. The membrane is conventionally deposited on the internal surface of the channels by a process of coating a slip of the porous inorganic material, followed by a consolidation heat treatment, in particular a drying and generally a sintering of the ceramic membranes.

Numerous publications indicate different configurations of the traversing channels which are targeted at obtaining a filter exhibiting the optimum properties for the application and in particular:
  a low pressure drop,
  a flow of permeate exiting from one channel to another in the plane of section of the filter which is as high and as homogeneous as possible,
  a high mechanical strength and in particular a high resistance to abrasion as measured by a scratch resistance test,
  a high selectivity with respect to the polluting species to be filtered,
  ideally, a high chemical resistance, in particular to acidity.

The studies carried out by the applicant company have shown, according to another complementary approach, that, within such filtering structures, it is of use to adjust the chemical composition of the separating membrane, in order to further improve the filtration performance of the structure, indeed even the lifetime of the filter. Such an aim is achieved in particular by the improvement to the resistance to abrasion of the membrane of the filter according to the invention, which can for this reason operate effectively over a substantially greater lifetime.

Numerous documents of the art describe different possible compositions for the ceramic membrane made of porous inorganic material without, however, establishing a causal relationship between the composition of the material constituting the membrane and the performance of the filter. According to one implementation, the application FR 2 549 736 proposes to increase the flow of filtered liquid by specifying the size of the particles forming the filtering layer, with respect to those forming the support. However, the layers made of alumina disclosed exhibit a flow regarded as weak from the viewpoint of the present invention.

Other publications, for example the patent application EP 0 219 383 A1, mention the use of silicon carbide and nitride as constituent material of the membrane. According to Example 2 of this publication, a filtering body, including the membrane layer formed of SiC particles, is directly calcined under nitrogen at a temperature of 1050° C. The resistance to abrasion of the membrane thus obtained has, however, appeared too low to make it possible to obtain filters having a prolonged lifetime.

The patent application WO 03/024892 describes a method of preparation of a support or of a membrane produced from a mixture of coarse α-SiC particles, of a metallic silicon powder and of a carbon precursor which are intended to form, between the coarse grains, a bonding phase of fine β-SiC particles. The bonding phase is finally subsequently converted, according to this teaching, into α-SiC by firing at a very high temperature (typically 1900 to 2300° C.)

The patent U.S. Pat. No. 7,699,903 B2 describes separating membrane layers made of silicon carbide starting from a mixture of two powders of α-SiC particles sintered together at a temperature of between 1750 and 1950° C.

The document EP 2 511 250 describes a porous support comprising SiC grains, the surface of which is covered with a nitrogen-comprising layer. This nitrogen layer is obtained by a nitridation treatment which makes it possible to control the resistivity for combustion gas decontamination. According to this publication, an attempt is made to thus obtain a filter or more exactly a support element made of SiC doped with nitrogen, the conductivity of which as a function of the temperature is controlled. It is clearly indicated in this document that said nitridation is carried out on the SiC grains constituting the porous support. The document thus does not describe the deposition of an additional layer (i.e., a separating membrane layer) on the internal surface of the channels or the external surface of the filtering element before nitridation.

Patent application EP 2 484 433 describes a particle filter for the purification of exhaust gases, the porous walls of which can comprise SiC and other particles than SiC, it being possible for these particles to be chosen from an oxide, an oxynitride or a nitride of an element of Groups 3 to 14 of the Periodic Table.

The object of the present invention is to provide a filter incorporating a filtering membrane which is resistant whatever its condition of use and the longevity of which is thus found to be improved thereby, for a filtration performance which is identical or substantially improved with respect to prior implementations.

In particular, an optimum in terms of resistance to abrasion and of filtration performance, whilst maintaining a very good selectivity, has been demonstrated by the studies of the applicant company, described below, by an appropriate selection of the constituent material of said membranes, it being possible to obtain said material by the process according to the invention.

Very particularly, an advantage not yet described in the art in sintering the membrane filters at high temperature under a nitrogen-containing atmosphere has been demonstrated by the studies of the applicant company, described below. This treatment has made it possible, according to the present invention, to obtain membranes that are very resistant to abrasion without increasing the size of the pores and therefore without reducing the selectivity of the filter, as is customarily observed on non-oxide membranes, in particular membranes made of silicon carbide (SiC) obtained by high-temperature sintering.

High-temperature sintered ceramic structures based on SiC comprising nitrogen via an annealing under $N_2$ are known. This nitrogen doping aims, in the publications known to date, to increase the electronic conductivity of dense products made of silicon carbide. For example, document U.S. Pat. No. 3,875,477 describes the use of such ceramics in the field of ceramic igniters. No document known to date discloses or suggests the use of such a material as a constituent of a porous membrane in a frontal or tangential filter in order to increase the performances thereof, in particular the selectivity and the mechanical stability especially during the filtration of fluids such as water comprising an ionic load.

In the present description, the terms separating membranes, separating layer or separating membrane layer are used without distinction to denote such membranes which make possible filtration.

The invention thus relates, according to a first aspect, to a filtering structure or filter configured for the filtration of a fluid, such as a liquid, comprising or composed of a support element made of a porous ceramic material, said element exhibiting a tubular or parallelepipedal shape delimited by an external surface and comprising, in its internal portion, a set of adjacent channels, with axes parallel to one another and separated from one another by walls of said porous inorganic material, in which at least a portion of said channels and/or at least a portion of said external surface are covered with a porous separating membrane layer. During the operation of the filter, this layer, as indicated above, comes into contact with said fluid to be filtered circulating in said channels in order to make possible the tangential or frontal filtration thereof.

In a filter according to the present invention:
said layer is made of a material essentially composed of silicon carbide (SiC),
the content by weight of elemental nitrogen of the layer constituting the porous separating membrane layer is between 0.1% and 2%, preferably between 0.15 and 1.5%.

According to other optional and advantageous additional features of the separating membrane layer:
The SiC represents more than 95%, preferably more than 97% of the weight of the material constituting the separating membrane layer.
The content by weight of elemental nitrogen of the layer constituting the porous separating membrane layer is between 0.1% and 1.5%, more preferably between 0.1% and 0.5%.
The porosity of the separating membrane layer is between 10% and 70%, especially between 30% and 60% and the median pore diameter is between 10 nanometers and 5 micrometers, preferably between 100 and 1500 nanometers, in particular between 200 and 1000 nanometers.
The median size of the SiC grains in said material is between 20 nanometers and 10 micrometers, preferably is between 0.1 and 1 micrometer, as can be conventionally measured by analysis of photographs obtained by scanning electron microscopy (SEM).
The content by weight of elemental oxygen of the material constituting the separating membrane layer is less than or equal to 1% and preferably is less than 0.5%.
The ratio $100 \times ([d_{90}-d_{10}]/d_{50})$ of pore diameters is less than 10, preferably less than 5, the $D_{10}$, $D_{50}$ and $D_{90}$ percentiles of a population of pores being the pore diameters respectively corresponding to the percentages of 10%, 50% and 90% on the cumulative distribution curve of distribution of pore sizes classified by increasing order and measured by optical microscopy.
The SiC making up the grains is essentially in a crystallographic form.
The elemental nitrogen is present at the grain boundaries and in the SiC grains making up the separating membrane layer.

In the material making up the ceramic membrane layer according to the invention, nitrogen is present in the grains by insertion into the crystal lattice of the SiC but also partially at the surface of the grains and at the grain boundaries, certainly owing to the porosity of the membrane layer and the small size of the grains making up the separating membrane layer. Without any theory being associated with this effect, it is possible that the nitrogen located at the surface and at the grain boundaries participates in the local modification of the surface in such a way that the flow of liquid is facilitated.

As regards the porous support, the following information relating to preferred but nonlimiting embodiments of the present invention is given:
- The porosity of the material constituting the porous support is between 20 and 70%, preferably between 30 and 60%.
- The median pore diameter of the material constituting the porous support is between 5 and 50 micrometers, more preferably between 10 and 40 micrometers.
- The porous support comprises and is preferably composed of a ceramic material, preferably a non-oxide ceramic material, preferably chosen from silicon carbide SiC, in particular liquid-phase or solid-phase sintered SiC, recrystallized SiC, silicon nitride, in particular $Si_3N_4$, silicon oxynitride, in particular $Si_2ON_2$, silicon aluminum oxynitride or a combination of these. Preferably, the support is composed of silicon carbide and more preferably still of recrystallized SIC.
- The base of the tubular or parallelepipedal shape is polygonal, preferably square or hexagonal, or circular. The tubular or parallelepipedal shape exhibits a longitudinal central axis of symmetry (A).
- In particular in the case of a frontal filtration filter, the channels are blocked at one end, preferably alternately, in order to define inlet channels and outlet channels so as to force the liquid entering via the inlet channels at the surface of which is deposited the membrane through which the liquid passes before being discharged via the outlet channels.
- If the filter is tangential, the end of the tubular support can be in contact with a plate leaktight to the liquid to be filtered and perforated at the point of the channels which face it so as to form a filtering support placed in a pipe or a filtration system. Another possibility can consist in introducing the tangential filter into the pipe, a peripheral seal leaktight at each end and around the filter, so as to provide the flow of permeate independently of the flow of concentrate.
- The elements are of hexagonal section, the distance between two opposite sides of the hexagonal section being between 20 and 80 mm.
- The conduits of the filtering elements are open on their two ends.
- The conduits of the filtering elements are alternately blocked on the face for introduction of the liquid to be filtered and on the opposite face.
- The conduits of the filtering elements are open on the face for introduction of the liquid and closed on the face for recovery.
- A majority of the conduits, in particular more than 50%, indeed even more than 80%, are of square, round or oblong section, preferably round section, and more preferably have a hydraulic diameter of between 0.5 mm and 10 mm, preferably between 1 mm and 5 mm. The hydraulic diameter Dh of a channel is calculated, in any plane of cross section P of the tubular structure, from the surface area of the section of the channel S of said channel and from its perimeter P, according to said plane of section and by application of the following classical expression:

$$Dh = 4 \times S/P$$

As indicated above, the filter according to the invention can comprise, in addition to the separating membrane layer, one or more primer layers arranged between the material constituting the support element and the material constituting the separating membrane layer. The role of this (these) "primer" layer(s) consists in facilitating the tying of the separating layer and/or in preventing the particles of the separating membrane from passing through the support, in particular during a deposition by coating.

The filter may additionally comprise one or more primer layers arranged between the material constituting the support element and the material constituting the separating membrane layer.

In the present description, unless otherwise specified, all percentages are by weight.

The invention also relates to a separating membrane layer as described above, made of a material essentially composed of silicon carbide (SiC), said silicon carbide additionally contains nitrogen, the content by weight of elemental nitrogen in said layer being between 0.1% and 2%.

Without it being necessary to list them again here, it is very obvious that the invention also relates to the separating membrane layers corresponding to all the preferred characteristics described above, in connection with the filtering structure in which said layer is incorporated.

Lastly, the invention relates to a process for manufacturing a separating membrane layer as described above, in a tangential or frontal filter, preferably a tangential filter, comprising the following steps:
- preparation of a slip from a powder of silicon carbide particles having a median size of between 20 nanometers and 10 micrometers,
- application of said slip to the support element, under conditions which make possible the formation of a thin layer of the slip on the internal part of the channels of said filter,
- drying and then firing under an atmosphere containing nitrogen at a temperature between 1400° C. and 2000° C. and for a time sufficient to obtain a separating membrane layer on their internal surface of said channels, said layer being essentially composed of silicon carbide containing nitrogen, the content by weight of elemental nitrogen in said layer being between 0.1% and 2%.

The following information is additionally given:

The open porosity and the median pore diameter of the porous support described in the present description are determined in a known way by mercury porosimetry.

The porosity and the median pore diameter of the separating membrane layer are advantageously determined according to the invention using a scanning electron microscope. For example, sections of a wall of the support in cross section are produced, as illustrated by the appended FIG. 2, so as to display the entire thickness of the coating over a cumulative length of at least 1.5 cm. The images are acquired on a sample of at least 50 grains. The area and the equivalent diameter of each of the pores are obtained from the photographs by conventional image analysis techniques, optionally after a binarization of the image targeted at increasing the contrast thereof. A distribution of equivalent diameters is thus deduced, the median pore diameter of which is extracted. Likewise, a median size of the particles constituting the membrane layer can be determined by this method.

An example of determination of the median pore diameter or of the median size of the particles constituting the membrane layer, by way of illustration, comprises the following sequence of stages which is conventional in the field:

A series of SEM photographs is taken of the support with its membrane layer observed along a cross section (that is to say, over the whole thickness of a wall). For greater clarity, the photographs are taken on a polished section of the material. The image is acquired over a cumulative length of the membrane layer at least equal to 1.5 cm, in order to obtain values representative of the whole of the sample.

The photographs are preferably subjected to binarization techniques well known in image processing techniques in order to increase the contrast of the outline of the particles or pores.

A measurement of this area is carried out for each particle or each pore constituting the membrane layer. An equivalent pore or grain diameter is determined, corresponding to the diameter of a perfect disk of the same area as that measured for said particle or for said pore (it being possible for this operation to be optionally carried out using dedicated software, in particular Visilog® software sold by Noesis).

A distribution of particle or grain size or of pore diameter is thus obtained according to a conventional distribution curve and a median size of the particles and/or a median diameter of pores constituting the membrane layer are thus determined, this median size or this median diameter respectively corresponding to the equivalent diameter dividing said distribution into a first population comprising only particles or pores with an equivalent diameter greater than or equal to this median size and a second population comprising only particles with an equivalent diameter lower than this median size or this median diameter.

Within the meaning of the present description unless otherwise mentioned, the median size of the particles or the median diameter of the pores measured by microscopy respectively denotes the diameter of the particles or of pores below which 50% by number of the population occurs. On the other hand, as regards the pore diameter measured on the substrate by mercury porosimetry, the median diameter corresponds to a threshold of 50% of the population by volume.

The term "sintering" refers conventionally in the field of ceramics (that is to say, within the meaning indicated in the international standard ISO 836:2001, point 120) to a consolidation by heat treatment of a granular agglomerate. The heat treatment of the particles used as starting charge for obtaining the membrane layers according to the invention thus makes possible the joining and the growth of their contact interfaces by movement of the atoms inside and between said particles.

The sintering between the SiC grains and the metallic silicon grains according to the invention is normally essentially carried out in the liquid phase, the sintering temperature being close to, indeed even greater than, the melting point of metallic silicon.

The sintering can be carried out in the presence of a sintering additive, such as a boron carbide, alumina or yttria generally in a content of less than 1% by weight. The term "sintering additive" is understood to mean a compound known usually for making possible and/or accelerating the kinetics of the sintering reaction. The median diameter $d_{50}$ of the powders of particles used to produce the support or the separating membrane layer is given conventionally by a particle size distribution characterization, for example using a laser particle sizer.

The contents by weight of elemental nitrogen and oxygen of the separating membrane layer can be determined after melting under an inert gas, for example using an analyzer sold under the reference TC-436 by Leco Corporation.

The SiC content can also be measured according to a protocol defined according to the standard ANSI B74.15-1992-(R2007) by a difference between total carbon and free carbon, this difference corresponding to the carbon fixed in the form of silicon carbide.

A nonlimiting example which makes possible the preparation of a filter according to the invention, very obviously also nonlimiting of the processes which make it possible to obtain such a filter and of the process according to the present invention, is given below:

According to a first stage, the filtering support is obtained by extrusion of a paste through a die configured according to the geometry of the structure to be produced according to the invention. The extrusion is followed by a drying and by a firing in order to sinter the inorganic material constituting the support and to obtain the characteristics of porosity and of mechanical strength necessary for the application.

For example, where a support made of SiC is concerned, it can in particular be obtained according to the following manufacturing stages:

Kneading a mixture comprising silicon carbide particles with a purity of greater than 98% and exhibiting a particle size such that 75% by weight of the particles exhibit a diameter of greater than 30 micrometers, the median diameter by weight of this particle size fraction (measured with a laser particle sizer) being less than 300 micrometers. The mixture also comprises an organic binder of cellulose derivative type. Water is added and kneading is carried out until a homogeneous paste is obtained, the plasticity of which makes possible the extrusion, the die being configured in order to obtain monoliths according to the invention.

Drying the crude monoliths using microwave radiation for a time sufficient to bring the content of not chemically bound water to less than 1% by weight.

Firing up to a temperature of at least 1300° C. in the case of filtering support based on liquid-phase sintered SiC, on silicon nitride, on silicon oxynitride, on silicon aluminum oxynitride or even on BN and of at least 1900° C. and less than 2400° C. in the case of a filtering support based on recrystallized SiC or solid-phase sintered SiC. In the case of a filtering support made of nitride or oxynitride, the firing atmosphere is preferably nitrogen-comprising. In the case of a filtering support made of recrystallized SiC, the firing atmosphere is preferably neutral and more particularly of argon. The temperature is typically maintained for at least 1 hour and preferably for at least 3 hours. The material obtained exhibits an open porosity of 20 to 60% by volume and a median pore diameter of the order of 5 to 50 micrometers.

The filtering support is subsequently coated according to the invention with a membrane (or separating membrane layer). One or more layers can be deposited in order to form a membrane according to various techniques known to the person skilled in the art: techniques for deposition starting from suspensions or slips, chemical vapor deposition (CVD) techniques or thermal spraying techniques, for example plasma spraying.

Preferably, the membrane layers are deposited by coating starting from slips or suspensions. A first layer (known as primer layer) is preferably deposited in contact with the porous material constituting the substrate, acting as tie layer. A nonlimiting example of an inorganic primer formulation comprises from 30% to 50% by weight of SiC powder(s) with a median diameter of 2 to 20 microns, the remainder being of demineralized water (apart from the optional organic additives).

Typically, a primer formulation comprises, by weight, from 25 to 35% of an SiC powder with a median diameter of 7 to 20 microns, from 15 to 25% of an SiC powder with a median diameter of 2 to 6 microns, the remainder at 100% being contributed by demineralized water (apart from the organic additives or additions).

Although preferably present, in some filter configurations this primer layer may be absent without departing from the scope of the invention.

A second layer of finer porosity is subsequently deposited on the primer layer (or directly on the support), which constitutes the membrane or separating membrane layer proper. The porosity of the latter layer is appropriate for conferring, on the filtering element, its final filtration properties, in particular its selectivity via an adjusted value of its median pore diameter. A nonlimiting example of an inorganic separating layer formulation comprises 30% to 50% by weight of SiC powder(s) with a median diameter of 0.1 to 1 microns, the remainder being of demineralized water (apart from the optional organic additives).

In order to control the rheology of the slips and to observe a suitable viscosity (typically of between 0.01 and 1.5 Pa·s, preferably 0.1 and 0.8 Pa·s, under a shear gradient of 1 $s^{-1}$ measured at 22° C. according to the standard DIN C 33-53019), thickening agents (according to proportions typically between 0.02 and 2% of the weight of water). Bonding agents (typically between 0.5 and 20% of the weight of SiC powder) and dispersing agents (between 0.01 and 1% of the weight of SiC powder) can also be added. The thickening agents are preferably cellulose derivatives, the bonding agents are preferably PVAs or acrylic derivatives and the dispersing agents are preferably of the ammonium polymethacrylate type.

Organic additions, expressed by weight of the slip, in particular Dolapix A88 as deflocculating agent, for example according to a proportion of 0.01 to 0.5%, Tylose, for example of MH4000P type, as thickener according to a proportion of 0.01 to 1%, PVA as adhesion agent in a proportion of 0.1 to 2%, expressed by dry weight, monoethylene glycol as plasticizer and 95 vol % ethanol as reducer of surface tension are more particularly appropriate.

These coating operations typically make it possible to obtain a primer layer with a thickness of approximately 30 to 40 micrometers after drying. During the second coating stage, a membrane layer with a thickness, for example, of approximately 30-40 μm is obtained after drying, this thickness range being, of course, in no way limiting.

The specific stages of a process according to the invention for the deposition of the separating membrane layer according to the invention on the support, optionally above the primer layer described above, are described below:

According to a first preferred embodiment, a slip is prepared as indicated above from a powder or preferably several powders of silicon carbide particles having various particle sizes and in the presence of the amount of water which preferably makes it possible to observe the conditions of rheology and of viscosity which are described above, and also in the presence of the organic agents necessary, preferably, so as to obtain a slip having a pH of less than or equal to 10.

The slip is subsequently applied to the support element, under conditions and by means appropriate for making possible the formation of a thin layer on the internal part of the channels of said filter, such as in particular described above.

After application of this layer, the support is first dried at ambient temperature, typically for at least 10 minutes, and then heated at 60° C. for at least 12 hours. Finally, a porous separating membrane layer at the surface of the channels of the support is obtained by sintering in a furnace, in an atmosphere comprising nitrogen, preferably under an atmosphere comprising very predominantly or exclusively gaseous nitrogen ($N_2$), at atmospheric pressure (1 bar). The firing temperature is typically at least 1400° C., preferably at least 1500° C. and is preferably less than 2000° C., more preferably less than 1900° C., for a sufficient time, especially of at least one hour, in order to obtain the nitrogen content within the membrane as described above according to the invention.

According to a second alternative embodiment, a filter coated with a ceramic slip of the membrane layer is sintered according to a first step under argon typically between 1400° C. and 2000° C., preferably between 1400° C. and 1800° C., then according to a second step the filter with its sintered membrane is subjected to a heat treatment at a temperature typically of at least 1000° C., preferably between 1100° C. and 1400° C., more preferably between 1100° C. and 1200° C., under a non-oxidizing atmosphere based on nitrogen, in particular under a reducing atmosphere containing a mixture of nitrogen and hydrogen, for example, by volume, 5% of hydrogen $H_2$ per 95% of nitrogen $N_2$, according to a hold time of 0.5 to 5 h, preferably 1 h to 2 h. For example, with a temperature rise of 5° C./min up to 1200° C. and a hold of 2 h then a drop back to ambient temperature with a rate of 5° C./min is adequate.

According to a third embodiment, for the initial slip use is made of one or more powders of silicon carbide prefired under a nitrogen atmosphere until a content by weight of elemental nitrogen in the SiC grains of between 0.1% and 0.5% is obtained. After application of the slip according to the principles described above, the final filter provided with the separating membrane layer is obtained by sintering under argon or under an argon/nitrogen mixture between 1400° C. and 1800° C., preferably between 1400° C. and 1650° C.

The thickness of the separating membrane layer obtained is preferably between 10 and 60 micrometers. The electron microscopy and X-ray fluorescence analyses show that the material thus obtained is composed essentially of α-SiC grains.

In a manner essential to obtaining the desired properties according to invention, the silicon carbide powders initially chosen in the process for preparing the separating membrane layer are selected according to the following criteria:
  the initial SiC powder has a content of metallic Si of less than 1.0% by weight, preferably of less than 0.5% by weight, or even of less than 0.2% by weight,
  the initial SiC powder has a content of elemental oxygen of less than 2.0% by weight, preferably of less than 1.5%, or even of less than 1.0%.

According to the process used according to the invention for obtaining the separating membrane layer, the temperature range of the sintering heat treatments described above, associated with a formulation of the membrane comprising (via the choice of the initial reactants, see previous paragraph) very little metallic silicon capable of reacting with the nitrogen-containing atmosphere, advantageously makes it possible to saturate the surface of the grains and of the grain boundaries with nitrogen without however forming detectable nitride phase(s), especially in the form of acicular fibers or particles characteristic of the presence of $Si_3N_4$. Also, since said sintering treatments are carried out in an atmosphere virtually free of oxygen (weight concentration typically of less than 50 ppm, or even less than 25 ppm of oxygen), there is no oxidation reaction of the SiC capable of reacting with the nitrogen of the firing atmosphere and forming a nitride or oxynitride phase that is detectable at the surface of the grains or between the grains making up the separating membrane layer.

If the filter is configured for an application in tangential filtration, it can be attached to a perforated plate at the point of the openings of channels, in leaktight manner, in order to be installed in a pipe or a filtration system. The heat treatment employed to attach the perforated plate to the filter support has to be carried out at a temperature lower than the decomposition temperature of the composite membrane.

If the filter exhibits channels which are alternately blocked in order to obtain a membrane filter which operates according to the principles of frontal filtration and if the blocking is carried out subsequent to the deposition of the membrane, at least for one face of the filter, either on the side of the inlet channels or on the outlet side, the blocking can be carried out with an SiC slip, the blocking elements being sintered at a temperature lower than the decomposition temperature of the composite membrane, preferably at the same time as the membrane.

The figures associated with the examples which follow are provided in order to illustrate the invention and its advantages, without, of course, the embodiments thus described being able to be regarded as limiting of the present invention.

Figure 1:
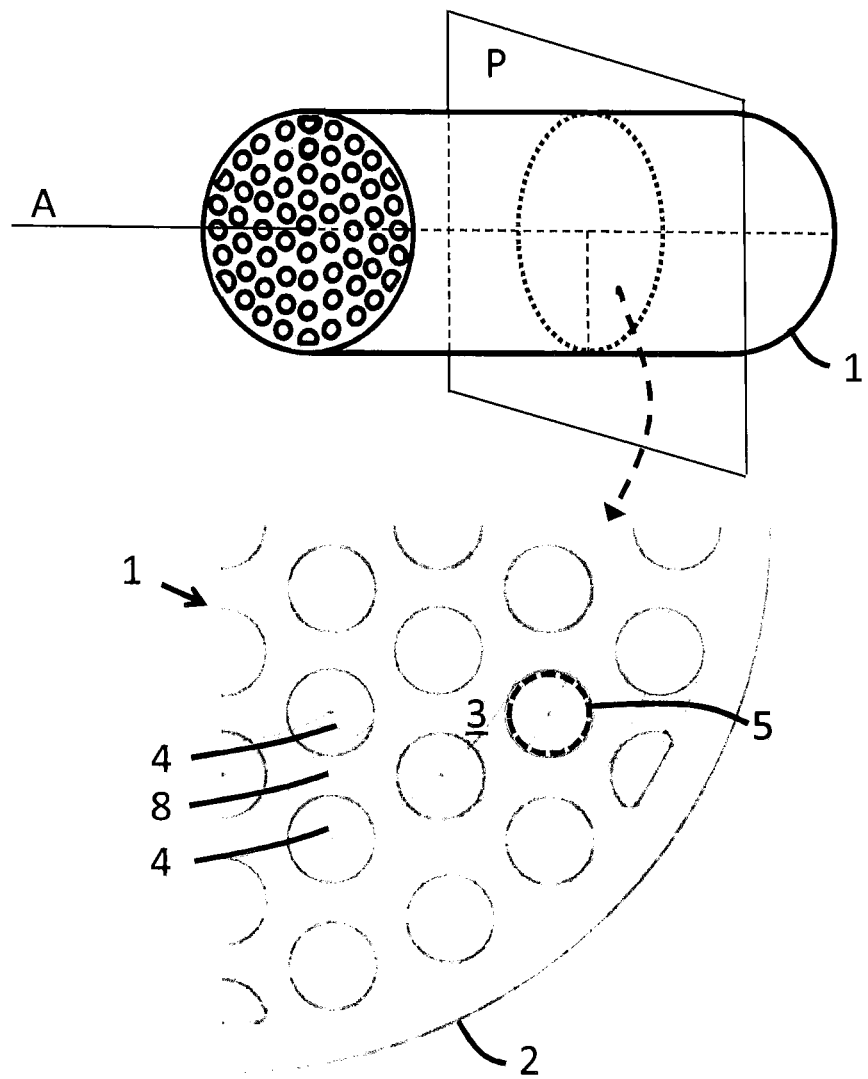
FIG. 1 illustrates a conventional configuration of a tubular filter according to the current art, along a plane of cross section P.

FIG. 1 illustrates a tangential filter 1 according to the current art and in accordance with the present invention, as used for the filtration of a fluid, such as a liquid. FIG. 1 represents a diagrammatic view of the plane of cross section P. The filter comprises or generally is composed of a support element 1 made of a porous inorganic material, preferably a non oxide. The element conventionally exhibits a tubular shape with a longitudinal central axis A, its shape being delimited by an external surface 2. It comprises, in its internal portion 3, a set of adjacent channels 4, with axes parallel to one another and separated from one another by walls 8. The walls are made from a porous inorganic material which allows the filtrate to pass from the internal portion 3 to the external surface 2. The channels 4 are covered on their internal surface with a separating membrane layer 5 deposited on a tie primer, as illustrated by the electron microscopy photograph given in FIG. 2. This separating membrane layer 5 (or membrane) comes into contact with said fluid circulating in said channels and makes possible the filtration thereof.

Figure 2:
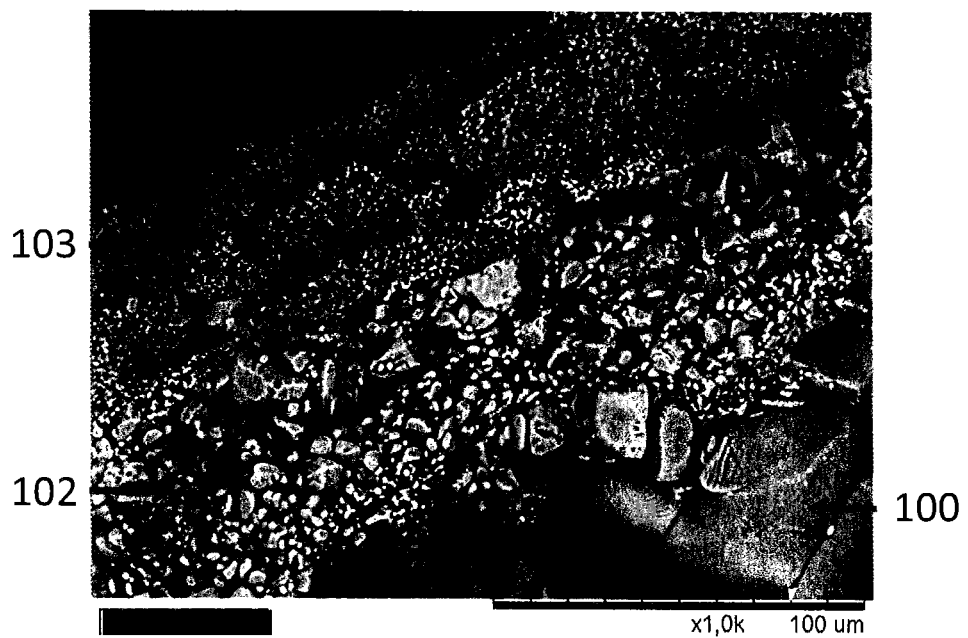
FIG. 2 is a microscopy photograph of a filter showing the separating membrane layer within the meaning of the present invention.

An electron microscopy photograph taken on a channel 4 of FIG. 1 has been given in FIG. 2. The porous support 100 of high porosity, the primer layer 102 making possible the tying of the separating membrane layer 103 of finer porosity, are observed in this figure.

According to another configuration, not represented, of another filter according to the invention, this other filter is configured in order for the fluid to be treated to initially pass through the external wall, the permeate being collected this time at the outlet of the channels. According to such a configuration, the filtering membrane layer is advantageously deposited on the external surface of the filter and covers at least a portion of it.

Such a configuration is often known as FSM (Flat Sheet Membrane).

The examples which follow are provided solely by way of illustration. They are not limiting and make possible a better understanding of the technical advantages relating to the use of the present invention.

The supports according to all the examples are identical and are obtained according to the same experimental protocol which follows:

The following are mixed in a kneader:
  3000 g of a mixture of the two powders of silicon carbide particles with a purity of greater than 98% in the following proportions: 75% by weight of a first powder of particles exhibiting a median diameter of the order of 60 micrometers and 25% by weight of a second powder of particles exhibiting a median diameter of the order of 2 micrometers. (Within the meaning of the present description, the median diameter $d_{50}$ denotes the diameter of the particles below which 50% by weight of the population of said particles occurs).

300 g of an organic binder of the cellulose derivative type. Water, approximately 20% by weight with respect to the total weight of SiC and of organic additive, is added and kneading is carried out until a homogeneous paste is obtained, the plasticity of which makes possible the extrusion of a structure of tubular shape, the die being configured in order to obtain monolithic blocks, the channels and the external walls of which exhibit a structure according to the desired configuration which is represented in the appended FIGS. 1 and 2.

More specifically, the fired monoliths exhibit round channels with a hydraulic diameter of 2 mm, the peripheral semicircular channels represented in the figures exhibiting a hydraulic diameter of 1.25 mm. The mean thickness of the external wall is 1.1 mm and the OFA (Open Front Area) of the inlet face of the filter is 37%. The OFA is obtained by calculating the ratio as percentage of the area covered by the sum of the cross sections of the channels to the total area of the corresponding cross section of the porous support.

For each configuration, 5 to 10 crude supports with a diameter of 25 mm and with a length of 30 cm are thus synthesized.

The crude monoliths thus obtained are dried by microwave radiation for a time sufficient to bring the content of not chemically bound water to less than 1% by weight.

The monoliths are subsequently fired up to a temperature of at least 2100° C., which is maintained for 5 hours. The material obtained exhibits an open porosity of 43% and a distribution mean pore diameter of the order of 25 micrometers, as measured by mercury porosimetry.

EXAMPLE 1 (COMPARATIVE)

According to this example, a separating membrane layer made of silicon carbide is subsequently deposited on the internal wall of the channels of a support structure as obtained above, according to the process described below: A tie primer for the separating layer is formed, in a first step, from a slip, the inorganic formulation of which comprises 30% by weight of a powder of grains of black SiC (Sika DPF-C), the median diameter $d_{50}$ of which is approximately 11 micrometers, 20% by weight of a powder of grains of black SiC (Sika FCP-07), the median diameter $d_{50}$ of which is approximately 2.5 micrometers, and 50% of deionized water.

A slip of the material constituting the filtration membrane layer is also prepared, the formulation of which comprises 40% by weight of SiC grains ($d_{50}$ of approximately 0.6 micrometer) and 60% of demineralized water.

The rheology of the slips was adjusted, by addition of the organic additives, to 0.5-0.7 Pa·s under a shear gradient of 1 $s^{-1}$, measured at 22° C. according to the standard DIN C 33-53019.

These two layers are successively deposited according to the same process described below: the slip is introduced into a tank with stirring (20 revolutions/min). After a phase of deaerating under slight vacuum (typically 25 millibar) while continuing to stir, the tank is overpressurized to approximately 0.7 bar in order to be able to coat the interior of the support from its bottom part up to its upper end. This operation only takes a few seconds for a support with a length of 30 cm. Immediately after coating the slip over the internal wall of the channels of the support, the excess is discharged by gravity.

The supports are subsequently dried at ambient temperature for 10 minutes and then at 60° C. for 12 h. The supports thus dried are subsequently fired under argon at a temperature of 1600° C. for 2 h at ambient pressure.

A cross section is taken over the filters thus obtained. The structure of the membrane is observed and studied with a scanning electron microscope.

EXAMPLE 2 (COMPARATIVE)

According to this example, the procedure is identical to that of example 1 but the filter is finally fired under argon at a temperature of 1800° C., for 2 h and at ambient pressure.

EXAMPLE 3 (ACCORDING TO THE INVENTION)

According to this example, the procedure is identical to that of example 1 but the filter is finally fired under nitrogen ($N_2$) at a temperature of 1800° C., for 2 h and at ambient pressure.

EXAMPLE 4 (ACCORDING TO THE INVENTION)

According to this example, the procedure is identical to that of example 1 but the filter is finally fired under nitrogen ($N_2$) at a temperature of 1600° C., for 2 h and at ambient pressure.

EXAMPLE 5 (ACCORDING TO THE INVENTION)

According to this example, the procedure is identical to that of example 1 but the filter is then subjected to a supplementary heat treatment consisting in a firing at 1200° C. for two hours under an atmosphere of 5% $H_2$/95% $N_2$ by volume.

EXAMPLE 6 (COMPARATIVE)

According to this example, the procedure is identical to that of the preceding example 2 but the final firing of the coated supports is carried out this time at a temperature of 1100° C. for 2 hours and under pure nitrogen. This example thus appears in accordance with the teaching of the applications EP 0 219 383 and EP 2 484 433 for the preparation of an SiC membrane filter.

The properties and the characteristics of the filters thus obtained are measured as follows:

The mean thickness of the successive layers obtained for each example is measured by image analysis on the basis of the electron microscopy photographs.

The mean thickness of the separating layer is of the order of 45 micrometers for all the examples. The median pore diameter of the separating membrane layer varies between 250 and 1100 nm according to the examples.

The other results as measured as indicated above are given in the following table 1.

The details of other experimental protocols followed are given additionally below:
a) A measurement of flow (relative flow rate of water) is carried out on the filters according to the following method:
At a temperature of 25° C., a fluid composed of demineralized water containing a load of $5\times10^{-3}$ mol/l of KCL feeds the filters to be evaluated under a transmembrane pressure of 0.5 bar and a rate of circulation in the channels of 2 m/s. The permeate (the water) is recovered at the periphery of the filter. The measurement of the flow rate characteristic of the filter is expressed in l/min per filtration surface area in $m^2$ after filtering for 20 h. In the table, the flow rate results have been expressed with reference to the data recorded for comparative example 1. More specifically, a value of greater than 100% indicates an increased flow rate with respect to the reference (example 1) and thus an improvement in the filtration capacity.
b) The measurement of the depth of scratching of the separating membrane layer, an essential longevity factor of the filter, also known as scratch test, is carried out using a Rockwell C diamond spheroconical point forming a conical angle of 120°, the radius of curvature of the point being 200 microns. The point is driven at an unchanging rate of 12 mm/min according to an incremental load of 1N per step of 1 mm over a measurement length of 6 mm. Several passes can be carried out. The deterioration in the coating is a combination of the elastic and/or plastic indentation stresses, of the frictional stresses and of the residual internal stresses within the layer of material of the coating. The depth of penetration of the indenter is measured after a sixth pass at the 4N step. The degree of depth of scratching was measured as percentage with respect to the reference (example 1) set at 100. The degree of resistance of examples 2 to 5 is calculated by determining the ratio of depth of the indenter of the example divided by the depth of the indenter measured with regard to example 1, a degree of less than 100% representing a greater scratch resistance than the reference.

The characteristics and the properties of the filters and of the separating membrane layer (designated by membrane in the table below) obtained according to examples 1 to 6 are given in table 1 below:

TABLE 1

|  | Example 1 (comp.) | Example 2 (comp.) | Example 3 (inv.) | Example 4 (inv.) | Example 5 (inv.) | Example 6 (comp.) |
|---|---|---|---|---|---|---|
| Content by weight of SiC of the membrane (%) | >99.0 | >99.0 | >99.5 | 99.3 | 99.3 | >98.5 |
| Content by weight of elemental nitrogen of the membrane (%) | <0.05 | <0.05 | 0.11 | 0.36 | 0.42 | <0.05 |
| Content by weight of elemental oxygen of the membrane (%) | 0.5 | 0.5 | 0.15 | 0.25 | 0.16 | >0.5 |
| Firing of the membrane | 1600° C./2 h Ar | 1800° C./2 h Ar | 1800° C./2 h $N_2$ | 1600° C./2 h $N_2$ | 1600° C./Ar 1200° C./2 h/ $H_2$—$N_2$ | 1100° C./2 h/ $N_2$ |
| Mean thickness of the separating membrane (micrometers) | 45 | 45 | 45 | 45 | 45 | 45 |
| Median pore diameter of the separating membrane (nm) | 600 | 1100 | 650 | 250 | 600 | 200 |
| Degree of scratching of the membrane | 100 | 63 | 65 | 85 | 90 | >>150 |
| Measurement of flow rate relative to KCl demineralized water | 100 | 150 | 140 | 80 | 135 | not measured |

The results combined in the preceding table 1 indicate that examples 3 and 4 according to the invention exhibit the best combined performances in the different tests and measurements carried out. In particular, the filters having a filtering membrane according to the invention exhibit a very high mechanical strength (scratch test) in comparison with the reference (example 1).

If reference is made to example 3 according to the invention compared to the reference example 1, the filter according to the invention exhibits a very superior filtration capacity, the sizes of the pores being substantially identical for both samples. Such measurements indicate a substantially increase in the filtration performances, while retaining the same selectivity.

If reference is made to example 4 according to the invention compared to the reference example 1, it is observed that it became possible, by application of the present invention, to offer highly selective filters, i.e. filters having a very fine pore size, while maintaining an acceptable filtration capacity.

Examples 3 and 4 are also characterized by the high mechanical strength of the filtering membrane layer obtained according to the invention, such an improvement logically leading to a considerably longer expected service life of the filter without significant deterioration of the filtration performances (flow rate, selectivity, etc.)

Example 5 according to the invention shows that the alternative mode of obtaining the membrane layer described above results in the same improvements, especially in terms of flow of permeate at the outlet of the filter.

The comparative example 6 (for which the temperature of calcination under nitrogen is only 1100° C.) exhibits a very high degree of scratching, that is to say a low mechanical strength. The data given in table 2 thus show that such a temperature, which is too low, does not make possible the insertion of elemental nitrogen into the material constituting the membrane.

In the end, the results combined in the table indicate that the material used according to the invention to manufacture the separating membrane layer can only be obtained following certain processing conditions not yet described in the prior art.

The invention claimed is:

1. A filter for the filtration of a fluid, comprising or composed of a support element made of a porous ceramic material, said support element exhibiting a tubular or parallelepipedal shape delimited by an external surface and comprising, in its internal portion, a set of adjacent channels with axes parallel to one another and separated from one another by walls of said porous ceramic material, in which:
   at least a portion of said channels are covered on their internal surface with a first porous separating membrane layer and/or at least a portion of said external surface is covered with a second porous separating membrane layer;
   wherein:
   said first and second porous separating membrane layers are made of a material consisting essentially of recrystallized silicon carbide (SiC), elemental nitrogen and elemental oxygen, and
   a content by weight of elemental nitrogen of the first and second porous separating membrane layers is between 0.1% and 2%,
   a porosity of the first and second porous separating membrane layers is between 30 and 70%,
   a median pore diameter of the first and second porous separating membrane layers is between 10 nanometers and 5 micrometers,
   the recrystallized SiC represents more than 97% of the weight of the material constituting the first and second porous separating membrane layers, each of the first and second porous separating membrane layers is made of SiC grains and elemental nitrogen is present both in the SiC grains as well as at boundaries of the SiC grains, and wherein a content by weight of elemental oxygen of the material constituting each of the first and second porous separating membrane layers is less than or equal to 0.5%.

2. The filter as claimed in claim 1, wherein the content by weight of elemental nitrogen of each of the first and second porous separating membrane layers is between 0.1% and 1.5%.

3. The filter as claimed in claim 1, wherein a median size of SiC grains in said material consisting essentially of silicon carbide, elemental nitrogen and oxygen is between 20 nanometers and 10 micrometers.

4. The filter as claimed in claim 1, wherein the porous support element comprises or is composed of a material selected from the group consisting of silicon carbide, SiC, recrystallized SiC, silicon nitride, silicon oxynitride, silicon aluminum oxynitride or a combination of these.

5. The filter as claimed in claim 1, wherein an open porosity of the porous ceramic material constituting the porous support element is between 20 and 60%, a median pore diameter of the porous ceramic material constituting the porous support element being between 5 and 50 micrometers.

6. The filter as claimed in claim 1, further comprising one or more primer layers arranged between the porous ceramic material constituting the support element and the material constituting each of the first and second porous separating membrane layers.

7. The filter as claimed in claim 1, wherein the fluid is a liquid.

8. A process for the manufacture of a separating membrane layer, in a tangential or frontal filter for the filtration of a fluid, comprising or composed of a support element made of a porous ceramic material, said support element exhibiting a tubular or parallelepipedal shape delimited by an external surface and comprising, in its internal portion, a set of adjacent channels with axes parallel to one another and separated from one another by walls of said porous ceramic material, wherein
at least a portion of said channels are covered on their internal surface with a first porous separating membrane layer and/or at least a portion of said external surface is covered with a second porous separating membrane layer,
said first and second porous separating membrane layers are made of a material consisting essentially of recrystallized silicon carbide (SiC), elemental nitrogen and elemental oxygen,
a content by weight of elemental nitrogen of the first and second porous separating membrane layers is between 0.1% and 2%,
a porosity of the first and second porous separating membrane layers is between 30 and 70%,
a median pore diameter of the first and second porous separating membrane layers is between 10 nanometers and 5 micrometers,
the recrystallized SiC represents more than 97% of the weight of the material constituting the first and second porous separating membrane layers,
each of the first and second porous separating membrane layers is made of SiC grains and elemental nitrogen is present both in the SiC grains as well as at boundaries of the SiC grains, and
a content by weight of elemental oxygen of the material constituting each of the first and second porous separating membrane layers is less than or equal to 0.5%, the process comprising:
preparing a slip from a powder of silicon carbide particles having a median size of between 20 nanometers and 10 micrometers,
applying said slip to the support element under conditions which make possible the formation of a thin layer of the slip on an internal part of the channels of said filter,
drying and then firing under an atmosphere containing nitrogen at a temperature of between 1400° C. and 2000° C. and for a time sufficient to obtain a porous separating membrane layer on their internal surface of said channels, said porous separating membrane layer consisting essentially of recrystallized silicon carbide (SiC), elemental nitrogen and elemental oxygen, and a content by weight of elemental nitrogen in said layer being between 0.1% and 2%.

9. A method comprising utilizing a filter for the filtration of a fluid, the filter comprising or composed of a support element made of a porous ceramic material, said support element exhibiting a tubular or parallelepipedal shape delimited by an external surface and comprising, in its internal portion, a set of adjacent channels with axes parallel to one another and separated from one another by walls of said porous ceramic material, in which:
at least a portion of said channels are covered on their internal surface with a first porous separating membrane layer and/or at least a portion of said external surface is covered with a second porous separating membrane layer;

wherein:
said first and second porous separating membrane layers are made of a material consisting essentially of recrystallized silicon carbide (SiC), elemental nitrogen and elemental oxygen, and
a content by weight of elemental nitrogen of the first and second porous separating membrane layers is between 0.1% and 2%,
a porosity of the first and second porous separating membrane layers is between 30 and 70%,
a median pore diameter of the first and second porous separating membrane layers is between 10 nanometers and 5 micrometers,
the recrystallized SiC represents more than 97% of the weight of the material constituting the first and second porous separating membrane layers,
each of the first and second porous separating membrane layers is made of SiC grains and elemental nitrogen is present both in the SiC grains as well as at boundaries of the SiC grains, and
a content by weight of elemental oxygen of the material constituting each of the first and second porous separating membrane layers is less than or equal to 0.5%.

10. The method as claimed in claim 9, wherein the filter is utilized for filtering an aqueous liquid.

* * * * *